United States Patent
Lundqvist et al.

(10) Patent No.: US 10,187,296 B2
(45) Date of Patent: Jan. 22, 2019

(54) ACCESS NODE DEVICE FOR FORWARDING DATA PACKETS

(71) Applicant: Huawei Technologies Co., Ltd., Shenzhen (CN)

(72) Inventors: Henrik Lundqvist, Kista (SE); George Koudouridis, Kista (SE); Petteri Kela, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 15/256,253

(22) Filed: Sep. 2, 2016

(65) Prior Publication Data
US 2016/0373343 A1  Dec. 22, 2016

Related U.S. Application Data

(63) Continuation of application No. PCT/EP2014/054266, filed on Mar. 5, 2014.

(51) Int. Cl.
*H04L 12/66* (2006.01)
*H04L 12/721* (2013.01)
(Continued)

(52) U.S. Cl.
CPC .......... *H04L 45/24* (2013.01); *H04L 12/4633* (2013.01); *H04L 12/66* (2013.01);
(Continued)

(58) Field of Classification Search
None
See application file for complete search history.

(56) References Cited

U.S. PATENT DOCUMENTS 7,881,215 B1* 2/2011 Daigle .................. H04L 67/142
370/252
8,379,624 B2 2/2013 Giese et al.
(Continued)

FOREIGN PATENT DOCUMENTS

CN 102572008 A 7/2012
EP 1770940 A1 4/2007
(Continued)

OTHER PUBLICATIONS

IEEE Std 802.11™—2012, IEEE Standard for Information technology—Telecommunications and information exchange between systemsLocal and metropolitan area networks—Specific requirements, Part 11: Wireless LAN Medium Access Control (MAC) and Physical Layer (PHY) Specifications, Mar. 29, 2012. total 2793 pages.
(Continued)

*Primary Examiner* — Duc T Duong
(74) *Attorney, Agent, or Firm* — Leydig, Voit & Mayer, Ltd.

(57) ABSTRACT

Embodiments of present invention relate to an access node device arranged for receiving and forwarding data packets in a communication network, the device comprising at least one processor arranged to: receive data packets from an user node; and forward the data packets in a stateless mode over a first path to a destination gateway node, the first path being a default path, or forward the data packets in a stateful mode over a second path to a destination node, the second path being determined by user and/or session specific information for said user node. Furthermore, the invention also relates to a corresponding gateway node device, a method in an access node, a method in a gateway node, a computer program, and a computer program product thereof.

25 Claims, 13 Drawing Sheets

(51) Int. Cl.
*H04L 12/741* (2013.01)
*H04L 12/707* (2013.01)
*H04L 12/725* (2013.01)
*H04L 12/46* (2006.01)
*H04W 92/04* (2009.01)

(52) U.S. Cl.
CPC ............ *H04L 45/306* (2013.01); *H04L 45/38* (2013.01); *H04L 45/74* (2013.01); *H04W 92/045* (2013.01)

(56) References Cited

U.S. PATENT DOCUMENTS

| | | | |
|---|---|---|---|
| 2006/0029064 A1 | 2/2006 | Rao et al. | |
| 2006/0187901 A1* | 8/2006 | Cortes | H04L 29/06027 370/352 |
| 2009/0304015 A1 | 12/2009 | Willars et al. | |
| 2010/0250648 A1* | 9/2010 | Cao | H04L 67/1002 709/203 |
| 2011/0145324 A1* | 6/2011 | Reinart | H04L 29/08792 709/203 |
| 2012/0014317 A1 | 1/2012 | Rahman | |
| 2012/0281540 A1 | 11/2012 | Khan et al. | |
| 2013/0067043 A1* | 3/2013 | Gaitonde | H04L 61/6059 709/220 |
| 2013/0100958 A1* | 4/2013 | Jalan | H04L 67/1027 370/401 |
| 2013/0318542 A1* | 11/2013 | Zamora | H04L 65/1016 719/313 |
| 2015/0188727 A1* | 7/2015 | Bruner | H04L 12/4633 370/329 |
| 2016/0164835 A1* | 6/2016 | Hoffmann | H04L 63/0272 726/1 |

FOREIGN PATENT DOCUMENTS

| | | |
|---|---|---|
| EP | 2293643 A1 | 3/2011 |
| JP | 2000132474 A | 5/2000 |
| JP | 2009526424 A | 7/2009 |
| JP | 2013085266 A | 5/2013 |
| JP | 2014017563 A | 1/2014 |
| KR | 20070037650 A | 4/2007 |
| WO | 2012048915 A1 | 4/2012 |
| WO | 2013070391 A1 | 5/2013 |

OTHER PUBLICATIONS

3GPP TR 23.887 V1.1.0(Jul. 2013)3rd Generation Partnership Project; Technical Specification Group Services and System Aspects;Machine-Type and other Mobile Data Applications Communications Enhancements(Release 12). Jul. 2013. total 153 pages.
3GPP TR 37.869 V0.3.0 (May 2013). 3rd Generation Partnership Project;Technical Specification Group Radio Access Network;Study on Enhancements to Machine-Type Communications (MTC) and other Mobile Data Applioations;Radio Access Network (RAN) aspects (Release 12), May 2013. total 25 pages.

* cited by examiner

ACCESS NODE DEVICE FOR FORWARDING DATA PACKETS

CROSS-REFERENCE TO RELATED APPLICATIONS

This application is a continuation of International Application No. PCT/EP2014/054266, filed on Mar. 5, 2014, which is hereby incorporated by reference in its entirety.

TECHNICAL FIELD

Embodiments of the present invention relate to an access node device for receiving and forwarding data packets in a communication network. Furthermore, the embodiments also relate to a corresponding gateway node device, a method in an access node, a method in a gateway node, a computer program, and a computer program product thereof.

BACKGROUND

Applications running on mobile devices are getting more and more diverse, which puts new requirements on the wireless communication networks. Currently, smart phones, laptops and tablets are the most frequently used mobile devices, but machines communicating with other machines without human intervention are expected to become the most common devices in the wireless communication networks in the future.

The current wireless communications are not properly adapted to this type of communication, which in particular for communication patterns when small amount of data is sent infrequently leads to significant performance inefficiency. This is a consequence of the rather rigid security and Quality of Service (QoS) management that the networks are supporting, but which many applications do not need. This has been observed by network operators and vendors, and efforts are ongoing to handle machine type communication in the Evolved Packet System (EPS) and Long Term Evolution (LTE).

In the longer term it is expected even larger changes to the network architecture with a closer integration of IEEE 802.11 (WLAN) based networks and cellular networks, as well as more dynamic roaming arrangements between service providers and network infrastructure providers.

However, the current solution in EPS/LTE is inefficient for single data packets because of: setup of tunnels delay for Authentication, Authorization and Accounting (AAA), User Equipment (UE) context fetch, etc. These tasks create a significant signalling and processing overhead in the network for connections that consist of very few packets. When data packets is to be sent in LTE/EPS from a UE which is initially in Radio Resource Control (RRC) idle state, a service request procedure is used, where the UE context is transferred to the eNB. LTE UE context contains UE Identities (IDs), bearer information and security information (e.g. encryption keys). This causes significant signalling and delay for small data transfers, which has been identified as a significant problem in current mobile networks as the traffic patterns get more diverse.

Therefore, 3GPP is currently working on enhancements for Machine Type Communications (MTC). The proposed solutions include allowing data to be sent over the control channels instead of the user plane to reduce the required scheduling. Another approach which comes is to keep the security context established between the UE and a core network node rather than the eNB, which was also the solution in General Packet Radio Service (GPRS). This reduces the required signalling when initiating a transmission.

The proposed solutions related to the MTC study item in 3GPP improve the current EPS network architecture by supporting connectionless services in a more efficient way. However, in a longer term, a new architecture that inherently matches the requirements of both connectionless and connection oriented services is preferable. The solution should also support dynamic roaming between different types of network and service providers in an efficient way. In addition to signalling and processing overhead there is also the problem with large delays for the initial packets when a connection is setup.

In terms of security the current solutions do provide good support for encryption in the access network. However, there are many conceivable attack vectors, and considering denial-of-service attacks it is in general dangerous to have procedures where a low amount of traffic from a host causes a large amount of work for the network.

SUMMARY

An objective of embodiments of the present invention is to provide a solution which mitigates or solves the drawbacks and problems of prior art solutions.

According to a first aspect of the invention, the above mentioned and other objectives are achieved with an access node device (1) arranged for receiving and forwarding data packets in a communication network (2), the device comprising at least one processor (20) arranged to:
  receive data packets from a user node (3); and
  forward the data packets in a stateless mode over a first path to a destination gateway node (4), the first path being a default path, or
  forward the data packets in a stateful mode over a second path to a destination node, the second path being determined by user and/or session specific information for said user node (3).

According to a second aspect of the invention, the above mentioned and other objectives are achieved with a communication network (2) comprising at least one access node device (1) according to an embodiment of the present invention.

According to a third aspect of the invention, the above mentioned and other objectives are achieved by a method in an access node arranged for receiving and forwarding data packets in a communication network (2), the method comprising the steps of:
  receiving (100) data packets from a user node (3); and
  forwarding (200) the data packets in a stateless mode over a first path to a destination gateway node (4), the first path being a default path, or
  forwarding (300) the data packets in a stateful mode over a second path to a destination node, the second path being determined by user and/or session specific information for said user node (3).

According to a fourth aspect of the invention, the above mentioned and other objectives are achieved with a gateway node device (4) of a communication network (2), comprising at least one processor (30) arranged to:
  receive data packets from a user node (3);
  identify said user node (3); and
  transmit instructions to one or more access node devices (1) whether data packets from said user node (3) should be forwarded in a stateless mode over a first path to said gateway node device (4), the first path being a default path, or in a stateful mode over a second path to a destination node, the second path being determined by user and/or session specific information for said user node (3).

According to a fifth aspect of the invention, the above mentioned and other objectives are achieved by a method in a gateway node (4) of a communication network (2), the method comprising the steps of:

receiving (400) data packets from a user node (3);
identifying (500) said user node (3); and
transmitting (600) instructions to one or more access node devices (1) whether data packets from said user node (3) should be forwarded in a stateless mode over a first path to said gateway node device (4), the first path being a default path, or in a stateful mode over a second path to destination node, the second path being determined by user and/or session specific information for said user node (3).

User specific information is information that relates to a specific customer of a service provider. A single user with a single user device/node may have customer relationships with multiple service providers. Therefore, there may be multiple parallel instances of user information relating to a single user device.

Session specific information is information about a single session of a user, relating to one or more services provided by a service provider. A service provider may provide multiple services of different characters, which therefore are provided with separate session information. Alternatively, a service provider may aggregate multiple services in a single session to limit the number of sessions. If the service provider limits the number of sessions to one per user, the session information would correspond to the user information.

Embodiments of present invention provide a solution which reduces session start-up time for sessions that do not need special QoS treatment. Further, less signalling and processing in the access network is needed since user specific state and processing is minimized for sessions with low packet transmission frequency.

Furthermore, roaming is made simple for the access network provider since it does not need to treat all users individually when data packets are forwarded in the stateless mode. Instead, a service provider can be made accountable for the aggregate traffic of its customers in an access network.

Embodiments of the present invention imply decoupling of the access network from the core network which allows different technical solutions and providers of the different parts, e.g. with respect to addressing. This has the benefit that only the gateway needs to investigate the data packet to identify the user and context. For longer sessions the resource allocation can be optimized if context/state information is available in the access network.

Also, improved location privacy is provided with preferred embodiments of the invention; the access network knows where the user node is but does not know the identity. The service provider knows the identity, but has only vague information about the user location (only in which network the user node is). Compared to current cellular systems, this separation of concerns improves location privacy.

According to an embodiment of the present access node device, the access node device is further arranged to forward data packets in the stateless mode or the stateful mode depending on type of service associated with the data packets. This allows the access node device to forward data packets in the stateless mode with minimal signalling and processing for some services, while providing sufficient quality for all services by forwarding data packets in the stateful mode for services with higher requirements.

According to yet another embodiment of the present access node device, the access node device is further arranged to forward the data packets in the stateful mode if: A) an inter-arrival time for a flow of data packets is smaller than a inter-arrival time threshold, and/or B) an amount of data packets in a received flow of data packets is more than a maximum threshold of consecutive data packets in the flow. This is a way to select forwarding mode based on measurements of the traffic characteristics, which does not require any information about the services. It is therefore useful also for service providers that provide for example Internet access. Service providers that provide value added services typically have more information about the specific service requirements and may therefore set service dependent thresholds. It is clear to those skilled in the art that there are different levels of service information that may be used, such as the protocols used at different layers of the protocol stack.

According to yet another embodiment of the present access node device, the access node device is further arranged to initially forward data packets in the stateless mode. This pattern will allow the first packets to be sent with minimal delay and optimize the packet handling only when it is motivated.

According to yet another embodiment of the present access node device, said destination gateway node (4) is a service provider gateway (SPGW) node associated with a specific service provider. This would make it easier for companies that sell network access bundled with a device or service, such as eBook readers coupled to a specific store or car navigation devices that download traffic information to use different access networks. Hence, the service provider can provide value added services, such as: video streaming, voice and video calls, internet retail, navigation services, map services, cloud services, sensor data collection, machine type communication, access to social networks, etc.

According to the above embodiment, the access node device is further arranged to forward data packets in the stateless mode according to an identifier identifying a service provider network associated with the SPGW. This does not require the access node device operator to take into account anything else than the service provider identity when it forwards the data packet, since the service provider handles the customer relation. By including the service provider identifier in each data packet allows forwarding in the stateless mode.

According to the above embodiment, the identifier is a global unique identity for the service provider network. The global unique identity may be a Uniform Resource Identifier (URI) or an Internet Protocol (IP) address. The global uniqueness has the advantage that the user node can use the same service provider ID regardless of over which communication network it transmits the data packets.

According to the above embodiment, the access node device is further arranged to use a routing table to map service provider identities with SPGW addresses when forwarding the data packets in the stateless mode. This allows the access node device to forward the data packets in stateless mode with minimal delay, while keeping a relatively stable routing table of a size that is proportional to the number of service providers it has contractual agreements with. This is efficient from storage and processing point of view.

According to yet another embodiment of the present access node device, the access node device is further arranged to use a reserved link layer address to identify data packets forwarded in the stateless mode. This has the advantage that it would be possible for the access node to forward the packet in the stateless mode even if it does not support IP routing.

According to yet another embodiment of the present access node device, the access node device is further arranged to forward data packets in the stateless mode to said destination gateway node (4) over at least one tunnel. By using a tunnel between the access node device and the SPGW has the advantage that the data packets are encapsulated with additional headers with the address of the SPGW, which is normally not present in the transmitted packet, and it is therefore possible to apply encryption on the tunnel to improve security.

According to yet another embodiment of the present access node device, the user specific information relates to one or more in the group comprising: type of subscription, encryption keys, quality of service requirements, charging information, active services of a user node, active applications of a user node, and security requirements of a user node. This information is suitable to determine the appropriate treatment of the data packets when they are forwarded in the stateful mode.

According to the above embodiment, the access node device is further arranged to use the user and/or session specific information in the stateful mode for controlling one or more system parameters in the group comprising: path, priority, encryption, quality of service, error control, rate limits, traffic limits, and congestion volume limits. This has the advantage that data packets associated with different services and users can receive differentiated treatment to fulfill varying requirements.

According to yet another embodiment of the present access node device, the access node device is further arranged to receive instructions, whether data packets should be forwarded in the stateless mode or the stateful mode, from said destination gateway node (4). This has the advantage that the access node device does not need to have access to any service or user specific information before this decision is taken, it is sufficient that the SPGW has access to the information.

According to yet another embodiment of the present access node device, the access node device is further arranged to receive instructions, about policing, charging, and security for data packets, from said destination gateway node (4) when switching from forwarding in the stateless mode to forwarding in the stateful mode. This has the advantage that mentioned functions can be applied close to the user nodes and provides better security for the user nodes and also to improve the resource usage in the network by applying policing as early as possible for traffic arriving from the user node.

According to the above embodiments, the instructions are only valid for a transmission session for said user node (3). This has the advantage that separate sessions for the same user node can receive different treatment. In particular it is beneficial that different service can be given to sessions of a user node towards separate service providers.

Moreover, according to an embodiment of the present gateway node device, the one or more access node devices (1) are instructed to forward data packets from said user node (3) in the stateless mode or the stateful mode depending on type of service associated with the data packets from said user node (3). This allows the gateway node device to forward data packets in the stateless mode with minimal signalling and processing for some services, while providing sufficient quality for all services by forwarding data packets in the stateful mode for services with higher requirements.

According to another embodiment of the present gateway node device, the one or more access node devices (1) are instructed to forward the data packets in the stateful mode if: A) an inter-arrival time for a flow of data packets from said user node (3) is smaller than a inter-arrival time threshold, and/or B) an amount of data packets in a received flow of data packets from said user node (3) is more than a maximum threshold of consecutive data packets in the flow. This is a way to select forwarding mode based on measurements of the traffic characteristics, which does not require any information about the services. It is therefore useful also for service providers that provide for example Internet access. Service providers that provide value added services typically have more information about the specific service requirements and may therefore set service dependent thresholds. It is clear to those skilled in the art that there are different levels of service information that may be used, such as the protocols used at different layers of the protocol stack.

According to yet another embodiment of the present gateway node device, an identity of said user node (3) is encrypted by means of a public key of said gateway node device (4). This embodiment allows the user nodes to connect to a service provider over different access networks without the need for an existing secret key pair, and is therefore an efficient way of implementing an initial access to the service provider.

According to yet another embodiment of the present gateway node device, the gateway node device is further arranged to drop the data packets received from said user node (3) if said user node (3) is not authorised to transmit data packets to a service provider associated with said gateway node device (4). This embodiment allows the access nodes to forward all data packets to the gateway node without any need for authentication or authorization in the access network. Since unauthorized data packets are dropped by the gateway node there is no incentive for malicious user nodes to send such data packets to the network. The access network nodes are therefore relieved of the processing related to security procedures.

Embodiments of the present invention also relate to a computer program, characterized in code means, which when run by processing means causes said processing means to execute any method according to the present disclosure. Furthermore, embodiments of the invention also relate to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Furthermore, applications and advantages of the embodiments of the invention will be apparent from the following detailed description.

BRIEF DESCRIPTION OF THE DRAWINGS

The appended drawings are intended to clarify and explain different embodiments of the present invention, in which:

FIG. 5 shows a flow chart for deciding in which mode an access node should operate in;

FIG. 12 illustrates another gateway node device according to an alternative embodiment of the present invention.

DETAILED DESCRIPTION

Figure 1:
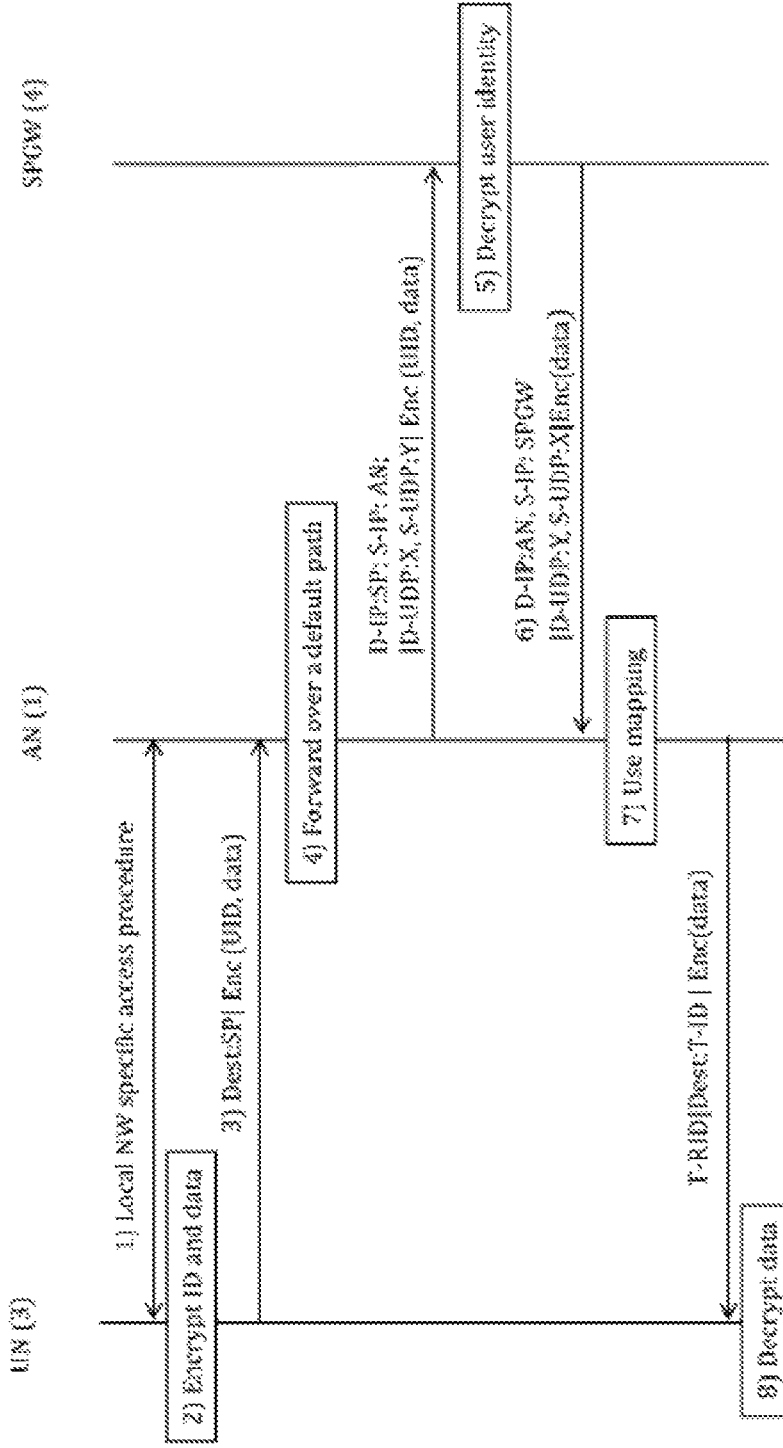
FIG. 1 illustrates an embodiment of the present invention.

Embodiments of the present invention relate to an access node device and a corresponding method for forwarding data packets in a communication network, such as LTE, wireless LAN (WLAN), Universal Mobile Telecommunications System (UMTS), Code Division Multiple Access (CDMA) 2000, Worldwide Interoperability for Microwave Access (WiMAX) or any other suitable communication networks.

The communication network where a user device, or user node, connects will be referred to as access network, or Radio Access Network (RAN). According to embodiments of the present invention data packets can be transmitted in the network using two different modes, i.e., a stateless mode in which the access network forwards packets over a predetermined default path with a minimum of processing of the packets, for example not using additional encryption or quality of service mechanisms, or a stateful mode where the forwarding of packets from a user node may be optimized in different ways, for example in terms of path, priority, encryption and error control based on user and/or session specific information for the user node.

This is achieved with the present access node device 1 arranged for receiving and forwarding data packets in a communication network 2. The present access node device 1 comprises at least one processor 20 arranged to: receive data packets from an user node 3; and forward the data packets in a stateless mode over a first path to a destination gateway node 4, the first path being a default path, or forward the data packets in a stateful mode over a second path to a destination node (e.g. an application server), the second path being determined by user and/or session specific information for said user node 3. It should be noted that in some cases the paths used in the stateless mode and the stateful mode may traverse the same physical links and nodes, but be separated logically, e.g., being sent in different traffic classes, over separate bearers or tunnels, and therefore by the processing the data packets are received on the different logical paths.

Figure 6:
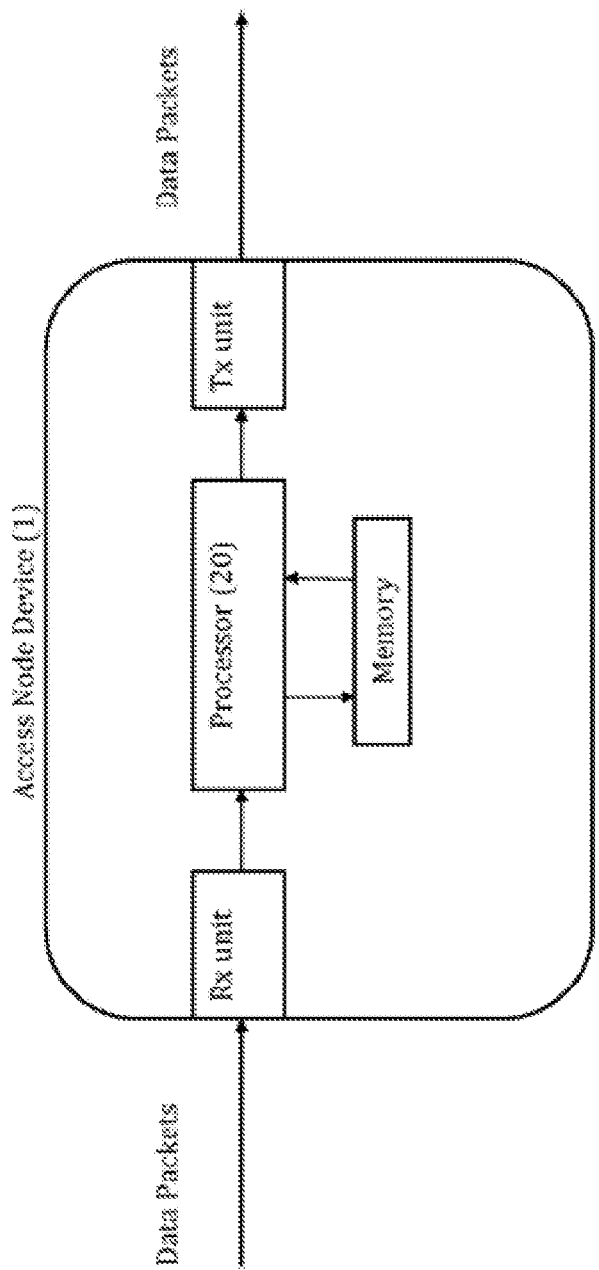
FIG. 6 illustrates a access node device according to an embodiment of the present invention.

An embodiment of the device 1 is illustrated in FIG. 6. The access node device 1 is arranged to receive data packets originating from a user device and to forward the data packets so that the data packets finally reach the destination gateway 4 through the network. Hence, the access node device comprises a receive (Rx) unit for receiving data packets and a transmit (Tx) unit for transmitting/forwarding data packets. The present processor 20 is therefore arranged to receive data packets from a user node 3; and forward the data packets in the stateless mode over a first path, or the stateful mode over a second path. The access node device can also have a memory for temporary storage of the data packets and for the processor 20 retrieving program instructions therefrom.

Figure 7:
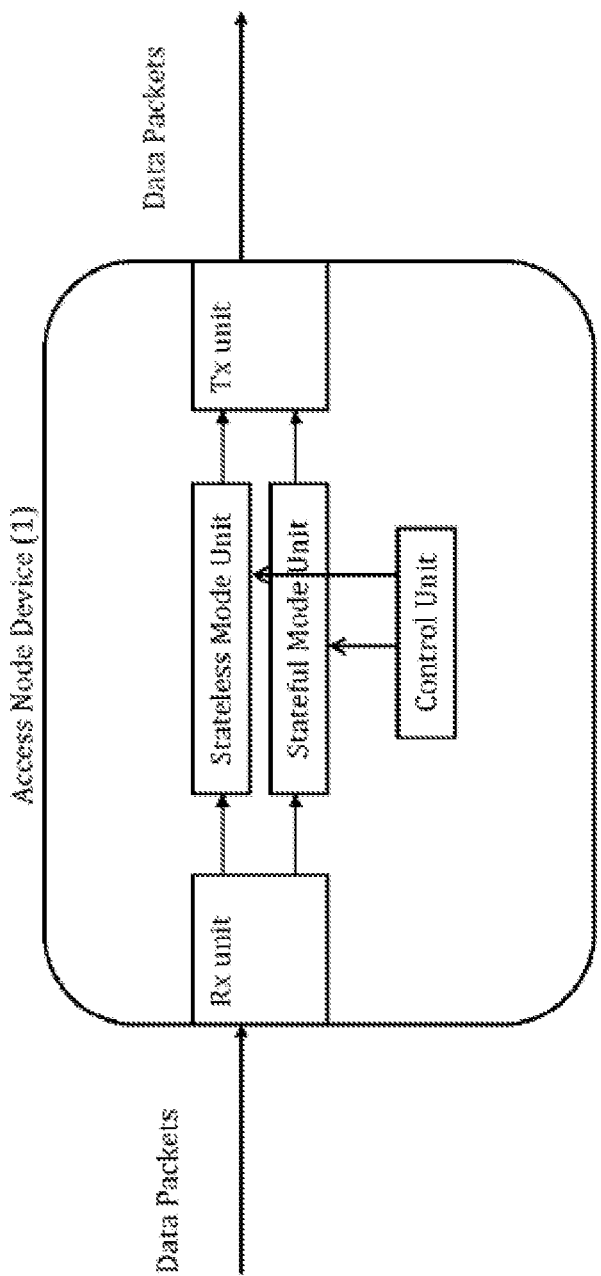
FIG. 7 illustrates an alternative access node device according to an embodiment of the present invention.

Alternatively, according to another embodiment of the invention the present access node device 1 comprises dedicated units for performing the different functions. This embodiment is illustrated in FIG. 7 in which the access node device 1 comprises dedicated units suitably connected to each other. The device according to this embodiment comprises a receive (Rx) unit, a transmit (Tx) unit; and a stateless mode unit arranged to receive and transmit data packets according to the stateless mode and a stateful mode unit arranged to receive and transmit data packets according to the stateful mode. A dedicated control unit may control the two mode units so that the access node device operates in the correct mode according to the embodiment of the invention.

In the stateless mode the amount of user or session related state information in the access network is kept at an absolute minimum when forwarding the data packets. However, in the stateful mode the access network keeps user and/or session specific information to be used for user and/or session specific treatment of the data packets when forwarding the data packets.

In the stateless mode the data packets from a user node are forwarded by one or more access nodes of a RAN to a destination gateway node of the communication network (the destination gateway node is not part of the RAN) over a predetermined default path. This means that the one or more access nodes of the communication network forward the data packets in the stateless mode without inspecting user and/or session specific information of the data packets except for possible mapping table in the access node for forwarding of possible return traffic from the destination gateway node to the user device.

The gateway node may be based on a router platform or server platform, and implements for example functions that receive traffic, identifies users, applies AAA for the user. It may also be part of a data centre, and can be implemented as part of a content delivery network. The access nodes may on the other hand, e.g., be an eNB, Wi-Fi access point, nodeB or Radio Node Controller (RNC) in UMTS, which are arranged to provide the user node with access to the communication network and forward traffic at network layer in an access network.

According to an embodiment of the present invention the user specific information relates to one or more in the group comprising: type of subscription, encryption keys, quality of service requirements, charging information, active services of a user node, active applications of a user node, and security requirements of a user node. Further, according to yet another embodiment the access node device is further arranged to use the user and/or session specific information in the stateful mode for controlling one or more system parameters in the group comprising: path, priority, encryption, quality of service, error control, rate limits, traffic limits, and congestion volume limits.

According to yet another embodiment of the invention the present access node device is further arranged to receive instructions from the destination gateway node 4 whether the data packets should be forwarded in the stateless mode or the stateful mode. The destination gateway node 4 may also signal instructions, about policing, charging, and security for data packets, to the access node device when it switches from forwarding in the stateless mode to forwarding in the stateful mode. The above mentioned the instructions from the destination gateway node 4 are only valid for a transmission session for the user node 3 according to yet another embodiment of the invention.

Moreover, the present communication system can according to another embodiment of the invention be arranged so that the destination gateway node can be a Service Provider Gateway (SPGW) node belonging to a service provider which has a low complexity technical interface with the access network, and can have a contract with the access network providers specifying accounting and charging for aggregate traffic (in the following disclosure the terms destination gateway node and SPGW will be used interexchangeable). According to yet another embodiment, this could be mean that data traffic transmitted in the stateless mode would be handled similar to current inter-domain Internet traffic on a contractual level, so that there would not be a need to identify specific users but only measure aggregate traffic volumes. This would make it easier for companies that sell network access bundled with a device or service, such as eBook readers coupled to a specific store or car navigation devices that download traffic information to use different access networks. Hence, the service provider can provide value added services, such as: video streaming, voice and video calls, internet retail, navigation services, map services, cloud services, sensor data collection, machine type communication, access to social networks, etc.

The choice of using stateless or stateful mode for transmission of data packets in the communication network depends on the characteristics and requirements of the data packet traffic. For example, a flow of data packets could be defined as a set of sequential packets between the same source (a user node) and a destination (gateway node) with a packet inter-arrival time below some threshold, e.g. 10 seconds. With such a definition, short flows, i.e. flows with only few packets would typically be more efficiently transmitted in the stateless mode to avoid that flow specific state has to be kept in the network. The exact packet inter-arrival time threshold to define a flow depends on what is reasonable from an implementation point of view. It shall also be noted that in the current context all traffic going to the same destination gateway may be considered as the same flow. Typically, in the stateful mode there will be some effort required to keep the state information updated, in particular when the user is moving, which means that also the user device may have increased energy consumption due to the required signalling.

A typical pattern according to an embodiment of the invention is to initiate a flow in the stateless mode, since the state will normally not be setup proactively, and then move to the stateful mode if one or more conditions are fulfilled. If it is a flow that will benefit from stateful mode the gateway node can transfer the state information to the access nodes when needed by suitable signalling methods. This pattern will allow the first packets to be sent with minimal delay and optimize the packet handling only when it is motivated.

Transmission in the stateless mode can work as follow:

A user device sends data packets to the access network using the normal medium access methods, e.g. contention based such as Carrier Sense Multiple Access (CSMA) or requesting resources via a Random Access Channel (RACH) channel. The access node of the RAN grants the resources or accepts the data packets without checking whether the user has a subscription that allows it to use the network;

The access node forwards the data packets to the SPGW using a default path with default QoS handling and without any additional encryption. The default path is determined based on unencrypted address information in the packet that is sufficient for the access network to infer the address of the SPGW. Security of the transmissions has to be handled between the user device and the SPGW, e.g., using long lived shared secrets;

The SPGW identifies the user device or the user of the device. Typically, there will already be a security context between the user device and the SPGW so that the SPGW can decrypt the data packet from the user device and read the user device identity. Note that the identity of the user device or its user is independent of the RAN, so it could e.g. be the account name of any Internet service that the service provider offers;

It shall be clear that an identity of a user device or user node may refer to some user identity which is associated to the user device, e.g. an account name of the user for a service which the service provider offers to the user. Although the user node identity or user device identity is mentioned, each user node may therefore have separate identities connected to different service providers, and the identities may not be statically connected to one user node.

FIG. 1 illustrates an embodiment of the present invention. In the first step 1) of FIG. 1 an access procedure between the access network and the user node is performed. This may follow the required specifications of the specific access network, and for example include accessing a random access channel and will typically result in the user node receiving a temporary local address or the access node learning the local address that the user node is using. In the second step 2) the user node encrypts its identity and the data it will transmit with encryption methods and keys that are known to the service provider. In the third step 3) the user node transmits the data to the access node, with the encrypted data and an identification of the service provider it is destined for. In the fourth step 4) the access node forwards the data over a default path to the SPGW based on the service provider identification provided by the user node. In one embodiment the access node encapsulates the packet with IP and User Datagram Protocol (UDP) headers which are addressed with a destination IP address of the service provider gateway, and source IP address of the access node, destination and source UDP ports X and Y that are selected uniquely by the access node for the user node that transmitted the packet. Alternatively, the UDP ports may be provided by the user node. In the fifth step 5) the SPGW decrypts the data transmitted by the user node using the known encryption keys, while selecting the encryption keys for example based on the used UDP ports, or using one of the further embodiments that are described in FIG. 2 and FIG. 3 below. In the sixth step 6) the SPGW encrypts data and send it back to the access network encapsulated with the IP address of the access node as destination IP address, the SPGW IP address as source address, and the destination and source UDP ports Y and X that were used in the packet it received from the access node. In the seventh step 7) the access node uses its mapping from IP addresses and port number to identify the user node it shall address the packet to and transmits the packet using the local address of the user node. Finally, the user node receives the data and can decrypt the packet.

According to yet another embodiment of the invention the SPGW applies policies to decide how the data packets should be treated, in particular if they should be dropped or forwarded. The policies can e.g. be based on the subscription data for the identified user device. The SPGW will also handle charging of the user device for the data traffic. The provider of the SPGW would be accountable for the traffic incurred in the access network and base its policies on its contracts with the RAN provider. Examples of functions handled by the SPGW are therefore policing, charging, and security for data packets of the user node device.

A particular class of policy that the SPGW may apply is to setup connection specific state in the access network so that the packets belonging to the same connection receive particular treatment, for example for better QoS or security.

Figure 5:
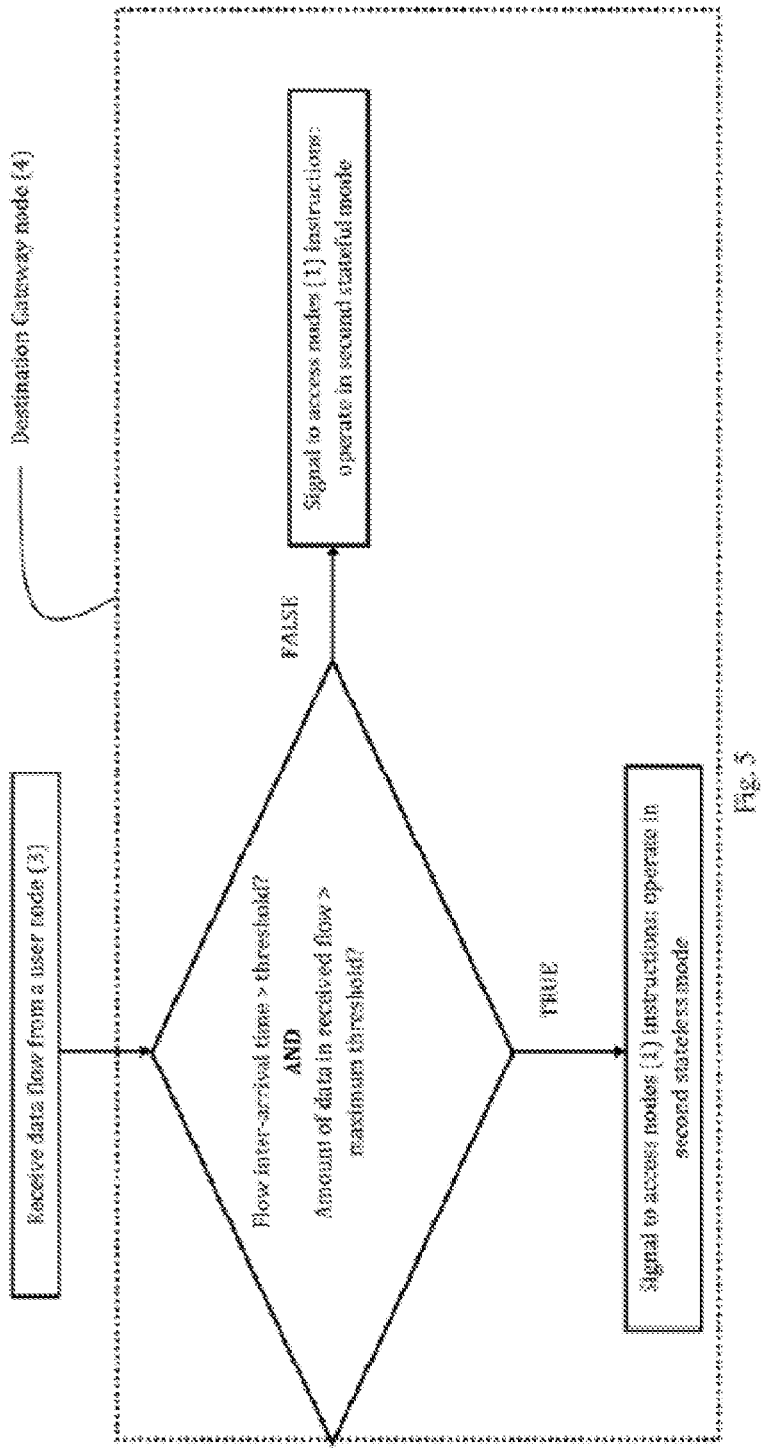

FIG. 5 shows a flow chart of another embodiment of the present invention. As shown in FIG. 5 the destination gateway receives information about a data flow for a user node. In this embodiment the gateway node checks if condition 1) an inter-arrival time for a flow of data packets is smaller than an inter-arrival time threshold, AND condition 2) an amount of data packets in a received flow of data packets is more than a maximum threshold of consecutive data packets in the flow. If this is TRUE, the access nodes should operate in the stateless mode when forwarding packets in the communication network and a control signal may be transmitted to the one or more access nodes informing them about the preferred mode, or they may continue using this mode by default. Else, if this is not TRUE (i.e. FALSE), a control signal is transmitted to the one or more access nodes that they should operate in the stateful mode.

To make the mode selection efficient the values of the inter-arrival threshold may be set based on typical time constants and signalling amount of the radio interface as well as the backhaul interfaces of the access network, e.g. how long the user node will remain active after it has sent a packet and how much signalling that is required to set up new connections on both the radio interface and the backhaul. The algorithm may also take into account the typical behaviour of the applications and services used. For example, setting the thresholds so that applications that do not need high performance typically use the stateless mode may be one preferred policy. It is also noted that the threshold may be dependent on the type of service associated with the data packets.

So in summary, according to an embodiment of the invention the data packets are forwarded in the stateful mode if: A) an inter-arrival time for a flow of data packets is smaller than an inter-arrival time threshold, and/or B) an amount of data packets in a received flow of data packets is more than a maximum threshold of consecutive data packets in the flow. Specific embodiment of this particular embodiment is: the data packets are forwarded in the stateful mode if both conditions A) and B) are TRUE.

It is also noted that according to a preferred embodiment of the invention the decision and whether access nodes should operate in the stateless or stateful mode is performed by the destination gateway node 4 as described above. Hence, the decision step of FIG. 5 is according to this embodiment executed in the destination gateway node which signals control instructions to the access nodes in this respect.

With respect to addressing issues there are three different levels of addresses or identities according to another embodiment of the invention, namely:

1. One permanent identity/address known only to the home network and encrypted between the user device and the home network for privacy reasons;
2. An address which is used in the visited network is needed to support bidirectional traffic between the user device and the gateway node. If the service provider (SPGW) does not need to reach the user this address may not be required; and
3. An identification of the service provider which allows the access network to route the packet to the right gateway.

To summarize, address 1) is used for identification of the user by the service provider. Address 2) is used by the access network for identification of the user device and for routing of Downlink (DL) traffic. Address 3) is used for routing of Uplink (UL) traffic. In the following sections possible solutions and preferred embodiments for those are described.

The access node(s) would keep a mapping from the service provider Identity (ID) to a path for the transmission to the SPGW. This is the third address 3) referred in the previous section. The path may e.g. be an IP address, an IP tunnel or a Multiprotocol Label Switching (MPLS) path/label. An example of the mapping table is illustrated in Table 1 which illustrates how a list or service provider identities can be mapped to IP addresses. The identification of the service provider could be for example: a) inferred from the sender IP address; b) the IP address of a service provider gateway; c) a URI that would be matched to a network address by the access network; d) an Access Point Name (APN) (in 3GPP networks); e) a service provider identification of a predetermined format which is allocated by ITU or similar (like a PLMN-ID); f) an IP address allocated by each service provider in agreement with the access network provider for the purpose of identifying the service provider; g) a name defined by an information centric network scheme.

The inclusion of the service provider identifier shall preferably be compatible with different access network technologies. One embodiment that fulfils this requirement is based on IP addresses, since virtually all access networks support IP addressing. By having IP addresses allocated to each service provider this can be achieved. If the service provider has control of a public IP address range the routing could be based directly on this address. That is, the user device would use a specific IP address out of the service provider address range, for example the lowest address. However, relying directly on IP-routing has some drawbacks: it does not work for service providers which do not have a public IP address range, secondly it introduces a dependency between IP routing tables and forwarding that may restrict the possibility to use efficient routing of packets from the access network to different SPGWs. This because there will typically be multiple SPGWs at different locations, but to make this transparent to the user device it should only need one service provider ID. To avoid that all SPGWs have to be in the IP domain of the service provider, IP routing based on this address should be avoided.

The option of an IP address allocated by each service provider in agreement with the access network provider for the purpose of identifying the service provider is therefore a good solution. In case the service provider has access to a public IP address range it may select one out of the addresses in this range to use as service provider ID. All user devices that may connect to the service provider would be configured with this IP address as service provider ID. If the service provider does not have access to a public IP address range, or if it is preferred to use private IP addresses, the service provider and the access network providers may agree to reserve a private IP address for the service provider ID. Note that the service provider should preferably have only one service provider ID agreed with all access network providers, which could be achieved by using an intermediary organization, such as a company, a standardization body or another international organization, that allocates the addresses. The access network would then need to keep a special table to identify packets sent with any of the allocated service provider IDs, and in particular the access networks need to avoid that these addresses are allocated to other users or used for normal routing within their domains. When an access network receives a packet from a user with one of the reserved IP addresses as destination, it recognizes that the packet shall be forwarded to an SPGW.

The access node would keep a mapping from the service provider ID to a path for the transmission to the destination SPGW. The path may e.g. may be given an IP tunnel, an MPLS path/label or determined by normal IP routing. An example of the mapping table is illustrated in Table 1. The access network would then encapsulate the packet in a suitable way for the transmission to the service provider. It could use an encrypted tunnel between access network and SPGW, but there is no particular need for this.

TABLE 1

Mapping of service provider ID to path in the network

| Service provider | Path in the network |
| --- | --- |
| SPID_1 | x.y.z.d |
| SPID_2 | x.y2.x.d |
| SPID_3 | y.z.c.d |

To make the detection of stateless mode transmissions more efficient in the access nodes it may be preferred to use specific lower layer mechanisms to recognize when a packet is intended to be forwarded in the stateless mode. This can for example be achieved by sending the packet with a specific reserved link layer destination address. This has the advantage that it would be possible for the access node to forward the packet in the stateless mode even if it does not support IP routing.

This embodiment is particularly favourable when the service provider ID is not in the form of an IP address. For example, the service provider ID may be in the form of a text string as in the examples c), d), e) and in some cases g) above. In this case, the service provider ID typically needs to be included as part of the data of the link level frame sent to the access network. The reserved link layer address would let the access network know that the packet is intended for a SPGW. The access node would therefore read part of the data that indicates the service provider ID. This part of the data could be sent unencrypted for example at the beginning of the data frame. It may be preceded by a length field, or use a defined end of field character to indicate the end of the service provider ID. An advantage of this type of service provider IDs instead of IP addresses is that it allows a larger freedom in the assignment of identifiers and minimizes the need to coordinate the allocation of IDs. It should be noted that in stateful mode there is no need to include the service provider ID in the packet, therefore it is necessary for the access node to use know that it is a packet that shall be sent in stateless mode before it reads the field containing the service provider ID. Using a reserved link layer address allows different packet formats to be used without causing errors.

Regarding the issue of user device identification there should be one permanent identity known only to the home network and encrypted between user and home network (for privacy reasons). This could e.g. be: the International Mobile Subscriber Identity (IMSI); a node/user ID; a long-lived IP address; a higher layer customer ID, for example a user name for a service or a customer number.

Further, an address which is used in the visited network is needed to support bidirectional traffic. If the home network (SPGW) does not need to reach the user node this address may not be required. This address could either be: a) an IP address (or similar) assigned by the home network on a relatively short lease for privacy reasons; b) it could be the link-local addresses, e.g. 802.11 MAC which would be known to both home and visited network; c) Cell Radio Network Temporary Identifier (CRNTI) (or equivalent) which the visited network would need to inform the home network about.

Figure 2:
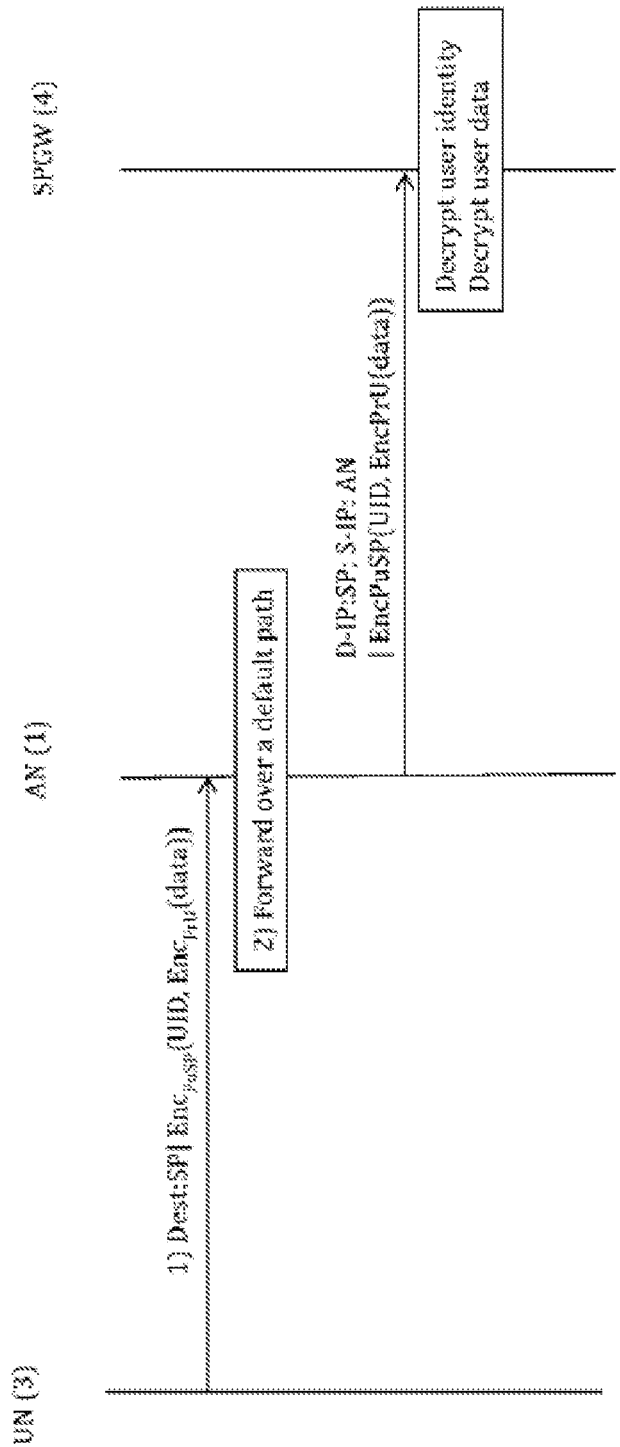
FIG. 2 illustrates another embodiment of the present invention.

A minimal solution that can be used to identify a user is illustrated in FIG. 2. If the security context is not established the SPGW must perform the AAA tasks with the help of available servers and databases. For example the user node could send its identity in encrypted form and use a public key of the SPGW to encrypt the identity in an asymmetric encryption method. The SPGW can then decrypt using its private key and identify the user based on a long lived/ permanent identity. The user may also encrypt the rest of the message with its private key, such that the SPGW can decrypt it with the public key of the user once it has decrypted the identity of the user.

FIG. 2 illustrates how the network can receive data and identify the user based on a permanent identity, this would be sufficient when only UL traffic is required. However, to also support return traffic to the user device further functionality is required. It should be noted that the service provider may apply different policies for whether both UL and DL traffic shall be allowed for a session.

FIG. 2 shows a minimal embodiment which can be used to initiate the communication between the user node and the SPGW using only long lived asymmetric encryption keys and a long lived user identity. In the first step 1) the user node encrypts the data using its own private key, and its identity using the public key of the service provider associated with the SPGW. The user node addresses the packet to the service provider and sends it to the access node. In the second step 2) the access node encapsulates the packet in an IP header addressed with a destination IP address of the SPGW, and source IP address of the access node. The SPGW can then use its own private key to decrypt the identity of the user node. With the information about the user identity it can select the public key of the user and decrypt the data.

Figure 3:
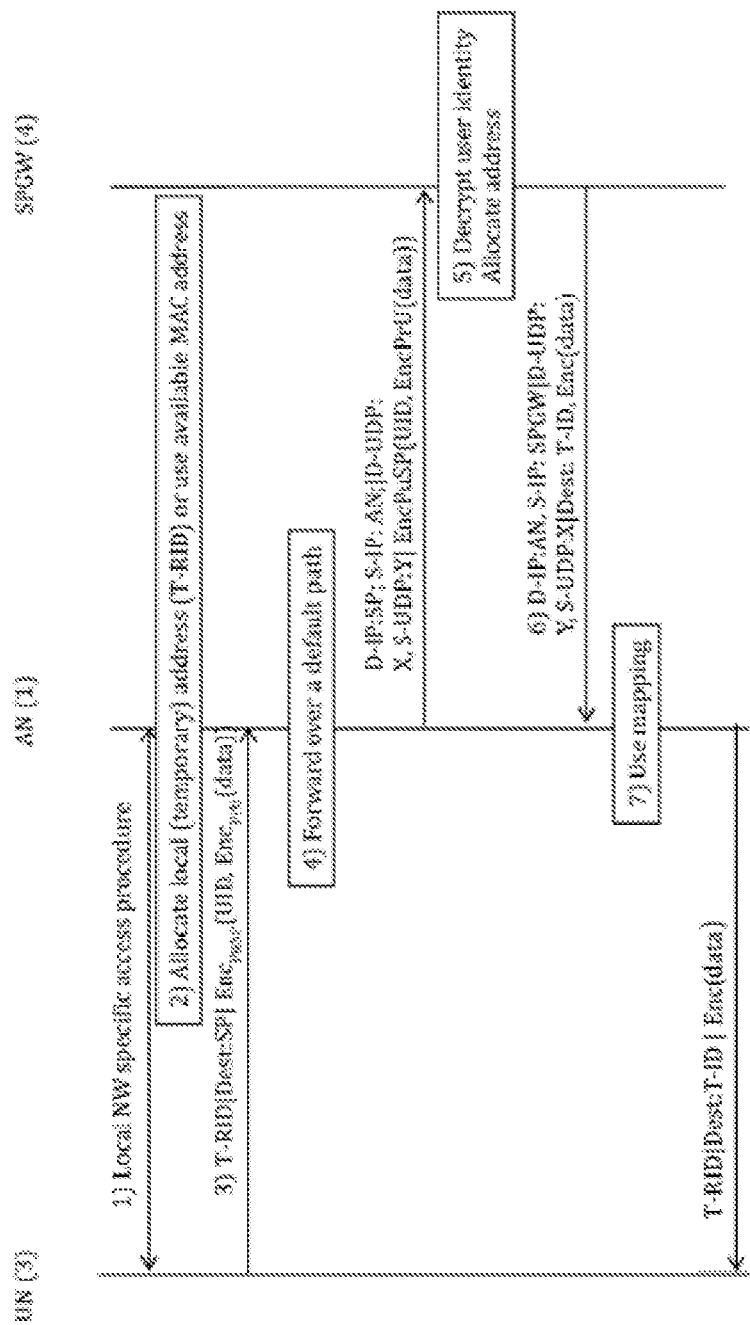
FIG. 3 illustrates a boot strapping solution supporting uplink (UL) and downlink (DL) transmission.

FIG. 3 illustrates a more typical embodiment, where the access network uses a local addressing scheme. This may for example be Radio Network Temporary Identifiers (RNTI) as used in LTE or MAC addresses as used in 802.11. The access network is therefore able to address returning traffic to the user. The access network forwards the packets from the user to the SPGW according to the service provider address/ identifier provided in each packet, without knowing any global identity of the user. However, to be able to distinguish which returning traffic from the SPGW shall be forwarded to each user, the access network embeds each packet from the user in a UDP packet, with specific port numbers for each user. It stores the mapping between the local user identifier (e.g. the RNTI or MAC address) and the UDP port numbers for the specific SPGW. Using this stored mapping the access network can then forward return traffic to the right user.

In the first step 1) of FIG. 3 an access procedure between the access network and the user node is performed. This may follow the required specifications of the specific access network, and e.g., include accessing a random access channel and will typically, in step 2), result in that the user node receiving a temporary local address or the access node learning the local address which the user node is using. Then the user node applies asymmetric encryption to encode the data using its own private key, and its identity using the public key of the service provider. The user node addresses the packet to the service provider and sends it to the access node. In the third step 3) the user node transmits the data to the access node, with the encrypted data and an identification of the service provider it is destined to. In the fourth step 4) the access node forwards the data over a default path to the SPGW based on the service provider identification provided by the user node. In one embodiment the access node encapsulates the packet with IP and UDP headers which are addressed with a destination IP address of the SPGW, and source IP address of the access node, destination and source UDP ports X and Y that are selected uniquely by the access node for the user node that transmitted the packet. In the fifth step 5) the SPGW uses its own private key to decrypt the identity of the user node. With the information about the user identity it can select the public key of the user and decrypt the data. The SPGW also allocates a temporary identity, from a name space belonging to the service provider to be used by the user node, and possibly also derive new encryption keys to be used in the communication between the user node and the SPGW. In the sixth step 6) the SPGW encrypts data and send it back to the access network encapsulated with the IP address of the access node as destination IP address, the SPGW IP-address as source address, and the destination and source UDP ports Y and X that were used in the packet it received from the access node. The SPGW also includes the temporary ID that has been allocated for the user node, and the encryption keys if applicable. It is clear that the new encryption keys would need to be encrypted by the known asymmetric encryption keys, i.e. at least the public key of the user node. In the seventh step 7) the access node uses its mapping from IP addresses and port number to identify the user node it shall address the packet to, and transmits the packet using the local address of the user node. The access node may also store the temporary ID of the user node and use that instead of the UDP ports when routing data to the user node. Finally, the user node receives the data and can decrypt the packet.

The SPGW may also assign a pseudonym address or identifier to the user that can be used in unencrypted form while the user is roaming in other networks. This may for example be an IP address, even if it is not used for IP-routing, because IP addresses are easy to handle for the networks. This pseudonym address can then serve the role of identifying the user in the SPGW before the messages are decrypted. Encryption keys for symmetric encryption can also be exchanged using the asymmetric encryption keys. Then, symmetric encryption can be used once the SPGW has the pseudonym to identify the user and can apply the right encryption keys. It is preferred to avoid using the asymmetric crypto and permanent addresses in frequent transmissions since it would be possible to distinguish unique users, even if it is not possible to identify them. One possible addition to make the encrypted user identity unique between multiple transmissions is to apply a function to obscure the identity based on some information that is available at both ends, such as the clock time and date, or some information which is included in the packet so that the receiver can use it for the decryption. To maintain the privacy of the user the pseudonym address may be relatively short lived, and a new address be reassigned periodically. An alternative would be to use some hash-function to generate the pseudonym from the permanent address, while including for example time information to make the pseudonym change over time and thereby protect the user privacy.

Once the identity of the user node has been established and encryption keys are shared between the user and the SPGW it is possible for the user to send traffic to the SPGW also over other access networks. A preferred solution that should work for different access networks would be that the access network allocates or uses a lower layer address. This address is not communicated to the service provider. Instead the SPGW provides the user with a higher layer pseudonym address. Even if an IP address is used as pseudonym, the access network would typically not use the pseudonym for IP layer routing of the packet, but it will use it to map the user to a the transmission over the backhaul to the SPGW. This would not imply setting up an IP-tunnel, but e.g. sending over UDP with user specific port numbers over an existing IP-tunnel. An IP-tunnel may be available permanently between the access network and the SPGW, for all traffic directed to the specific service provider. This solution is illustrated in FIG. 4.

Figure 4:
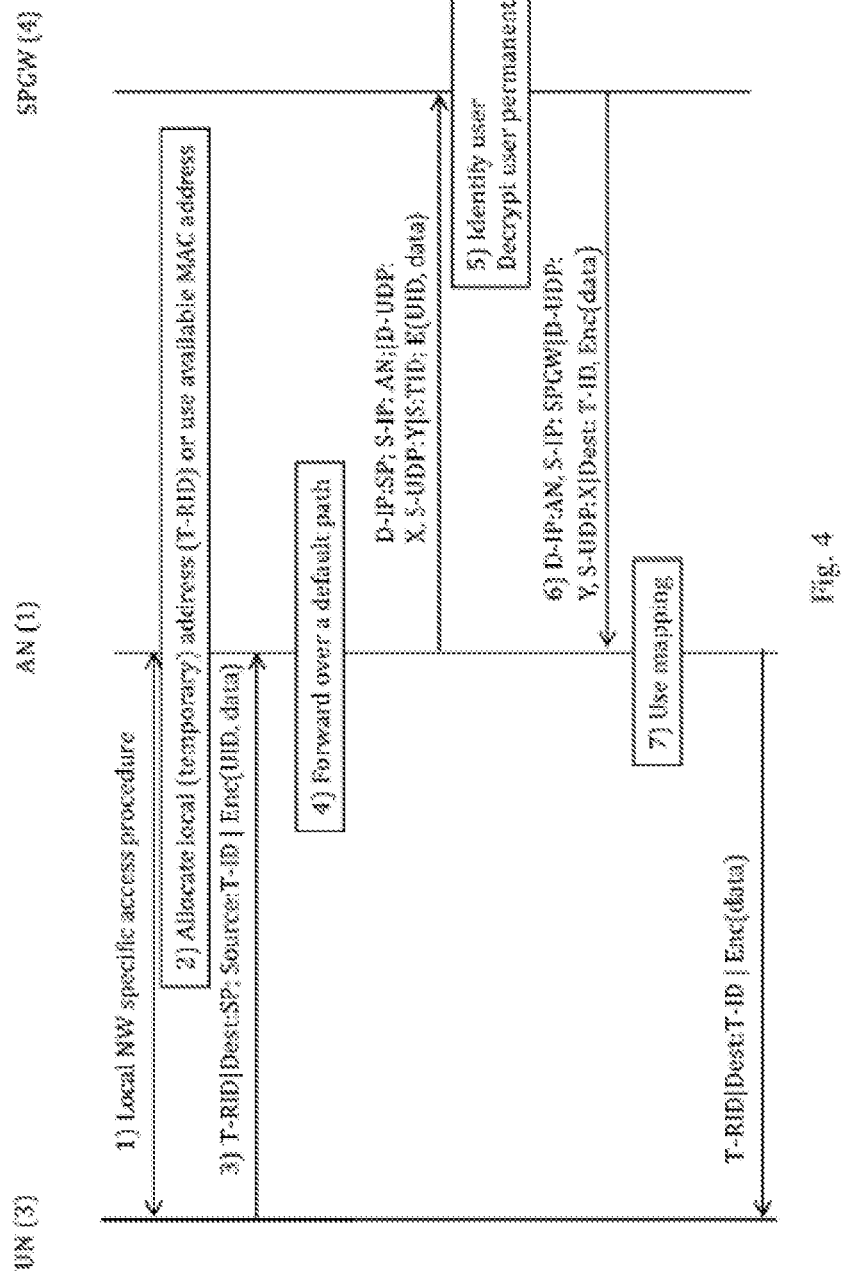
FIG. 4 illustrates an embodiment of an addressing solution.

FIG. 4 illustrates an embodiment where the user node has been allocated a temporary ID by the service provider that the user node may use when accessing other access nodes, which may also belong to other access networks. In the first step 1) of FIG. 4 an access procedure between the access network and the user node is performed. This may follow the required specifications of the specific access network, and e.g., include accessing a random access channel and will typically, in step 2), result in the user node receiving a temporary local address or the access node learning the local address the user node is using. In the third step 3) the user node encrypts its data and transmits the data to the access node, with an identification of the service provider it is destined to and the temporary ID it has previously been assigned from the service provider. For the local network addressing the user node uses the address it has been assigned from the access network. In the fourth step 4) the access node forwards the data over a default path to the service provider gateway, based on the service provider identification provided by the user node. In one embodiment the access node encapsulates the packet with IP and UDP headers which are addressed with a destination IP address of the service provider gateway, and source IP address of the access node. To identify the packets of the user node the gateway may either use the temporary SP provided ID or the destination and source UDP ports X and Y that are selected uniquely by the access node for the user node that transmitted the packet. This mapping is stored in the access node. In the fifth step 5) the SPGW receives the packet and uses the temporary ID to identify the user and select the encryption key of the user node to decrypt the data. The user node may also include its permanent user ID in the packet, which the SPGW may use for additional security procedures if needed. In the sixth step 6) the SPGW encrypts data and sends it back to the access network encapsulated with the IP address of the access node as destination IP address, the SPGW IP-address as source address. The SPGW may also use the destination and source UDP ports Y and X that were used in the packet it received from the access node to identify the user node. The SPGW also includes the service provider name space temporary ID that the user node has been allocated. In the seventh step 7) the access node uses its mapping from SPGW IP address together with either the port numbers or the temporary service provider-provided identifier to identify the user node the access node shall address the packet to and transmits the packet using the local address of the user node. Finally, the user node receives the data and can decrypt the packet.

Although it is mentioned above that the pseudonym will typically not be used for routing of the data, it is possible in some embodiments that the pseudonym contains the service provider ID. In this case it will be used also for routing towards the SPGW. This may for example be the case if the service provider allocates IP addresses from its own public address range.

Note that a UE can send data to multiple SPGWs through the same access network, and the access network will maintain separate mappings for each of the SPGW. Thereby, the user can connect to different service providers, and each service provider may use different charging and QoS arrangements adapted to the specific service provided. The user would use different service provider IDs and pseudonyms for packets to the different service providers. The access network would also maintain separate mappings for the different service providers to route to route the traffic correctly.

Multiple types of user specific information or variables that define a state for a user can be stored and used in the access network, with different advantages. By providing encryption keys to the access network it is not necessary to route all traffic through the SPGW. The encryption and decryption can be made in the access network which allows the routing to be optimized. Another class of state is the routing state in terms of mapping of addresses to paths, or specific tunnels for each user, in the communication network. It would also allow configuration of QoS parameters, for example resource reservation and prioritization.

Another type of state information, which is particularly important for the case where the service provider is liable for the traffic of the users, is policing information that can be used to prevent users from misbehaving. The service provider therefore needs to be able to provide information that allows the access network to identify the traffic from individual users so that it can be policed on a per user basis. This information may for example be traffic filters, quotas and access lists containing address information so that the access network can identify the traffic which belongs to the users that need to be policed.

According to yet another embodiment of the invention the service provider will measure the traffic coming through a particular access network. If the traffic level seems higher than expected the service provider may apply more accurate monitoring of the users sending and receiving traffic through that access network. The access network operator may also monitor the traffic going to or from different service providers and alert the service providers when the traffic level seems abnormal. Hence, according to this embodiment the SPGW (gateway node) is responsible for, among other things, policing, charging, and security for data packets of said user node when data packets are forwarded in the stateless mode.

It is also possible that the service provider measures the traffic for each individual user to determine if the traffic seems higher than normal. If this is the case the service provider may request the access network to police the traffic of the specific users that exceed the traffic limits by transferring them to a connection oriented mode where the access network keep user specific information. One example of such a policy that a SPGW may apply for a user it has identified is illustrated in FIG. 5. This policy will establish a connection for users that frequently transmit packets.

Alternatively, the SPGW may only share enough information with the access network to be able to identify and police the users that send more traffic than considered acceptable. For DL traffic the service provider can do this type of policing by itself since all DL traffic would pass through the SPGW as long as the stateless access network mode applies for the user. For the UL traffic it would be preferred to apply policing in the access network to avoid excessive traffic going through the whole path to the SPGW before being policed. The access network should therefore be provided with sufficient information to be able to identify and police the traffic for specific users. The SPGW could for example provide a traffic filter consisting of addresses at different layers (e.g. MAC, IP, transport layer port numbers) together with a packet rate limit, data rate limit, congestion volume limit or simply a request to block the user. When a user is blocked from one access network the SPGW may also explicitly or implicitly redirect the user to a different access network. This could be signalled to the user either before or when it is requested to leave the access network, or via a different access network.

In another embodiment the service provider may be offering specific value added services, such as video streaming, voice and video calls, internet retail or access to a social network. The SPGW would then have detailed knowledge of what service the user is requesting and the required QoS characteristics. Depending on its agreement with the access network operator the service provider can choose to keep the user in stateless mode or request the access network to setup state according to the QoS requirements. In particular, the SPGW may be collocated with a data centre from which the requested services are being provided to the user. The SPGW can then determine if the user is requesting a small amount of information or a more demanding service that is better served in a connection oriented mode, so that it is preferable to switch to a connection oriented mode.

When the SPGW determines that it is preferable to use a stateful mode to support QoS requirements it may request this QoS treatment to be setup by the access network using the QoS mechanisms supported by the specific access network. In one exemplary embodiment the SPGW may make the request by signalling to the Policy and Charging Control system of the access network operator.

Figure 8:
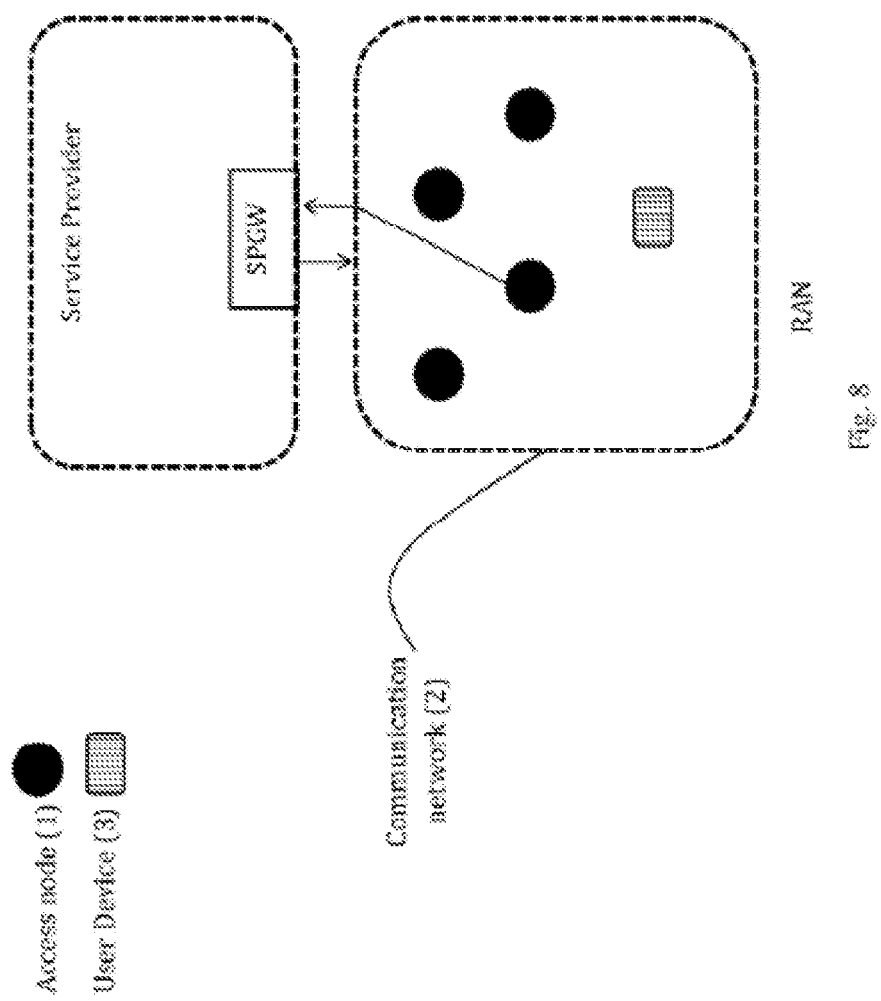
FIG. 8 illustrates how radio access network (RAN) and service provider network constitute separate network domains.

FIG. 8 illustrates a system overview how the RAN and the service provider network constitute separate network domains. The access nodes have default paths to reach the service provider network which leads to one SPGW. The default path for a specific access node is illustrated with an arrow in FIG. 8.

Figure 9:
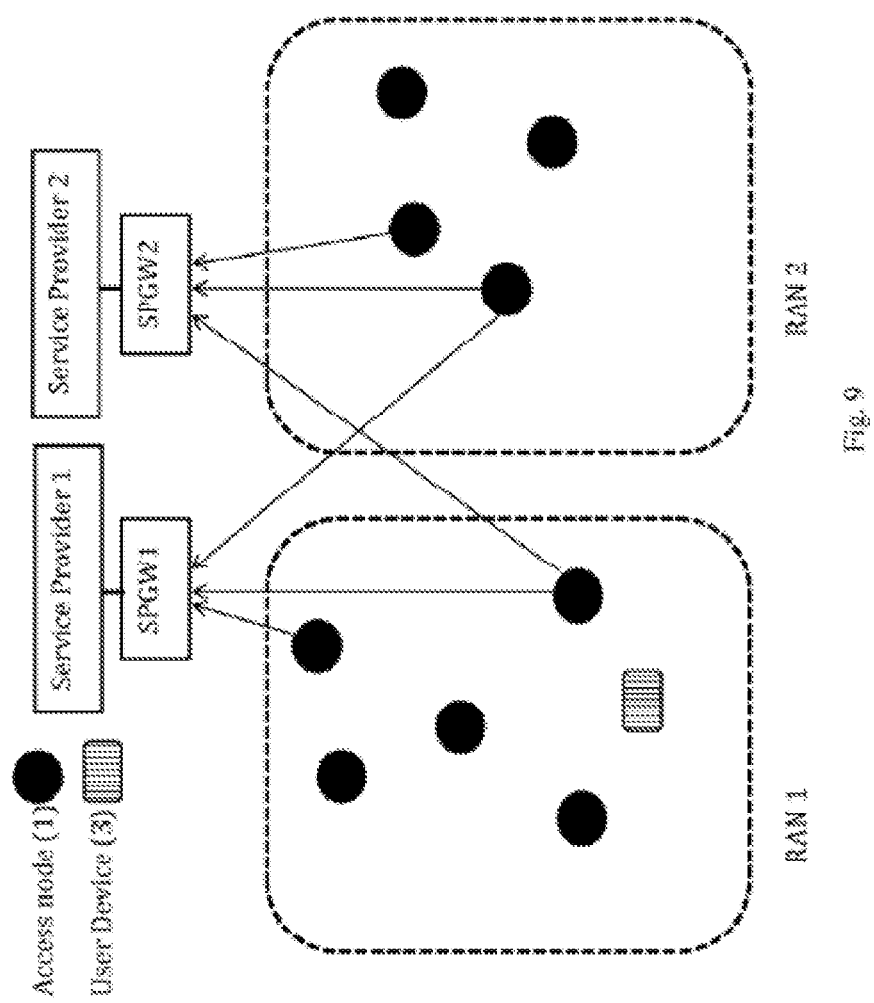
FIG. 9 illustrates that multiple RANs and multiple service provider networks are connected to each other.

FIG. 9 illustrates another system overview for the case with multiple RANs (only two RANs are shown in FIG. 9) and multiple service providers (only two service providers are shown in FIG. 9) connected to each other. Each access node may have separate default paths leading to the gateways of different service providers. When a data packet is received from a user device the data packet is forwarded to the correct SPGW based on the service provider ID. A user device may be logically connected to multiple service providers at the same time, while not being authenticated or identified by any RAN.

Figure 10:
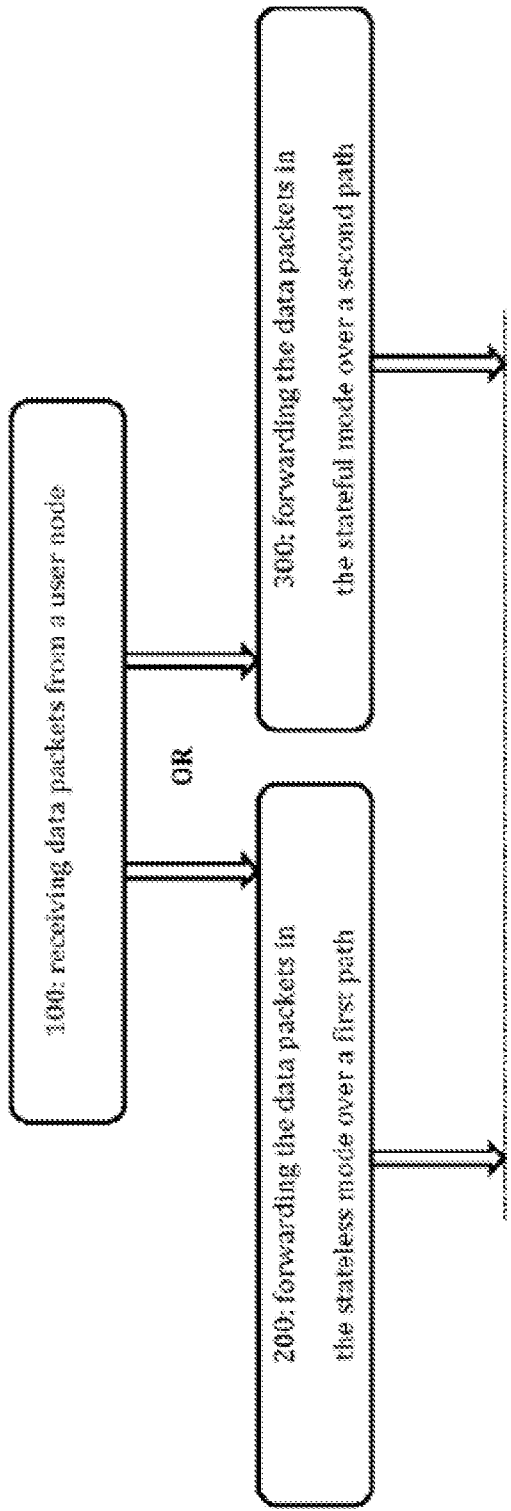
FIG. 10 illustrates a method in an access node according to an embodiment of the present invention.

Embodiments of the present invention also relate to a corresponding method in an access node of a communication network. The method comprises the steps of receiving 100 data packets from an user node 3; and forwarding 200 the data packets in a stateless mode over a first path to a destination gateway node 4, the first path being a default path, or forwarding 300 the data packets in a stateful mode over a second path to a destination node, the second path being determined by user and/or session specific information for said user node 3. This is illustrated in FIG. 10.

Figure 13:
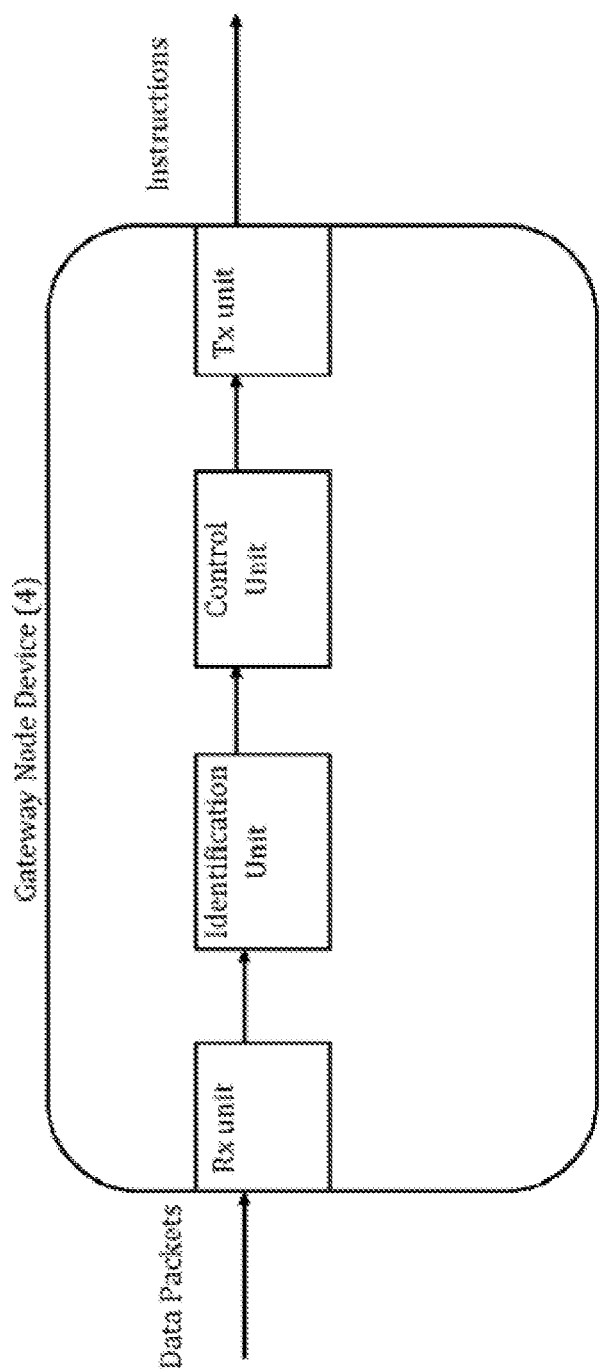
FIG. 13 illustrates a method in a gateway node device according to an embodiment of the present invention.
Figure 13:
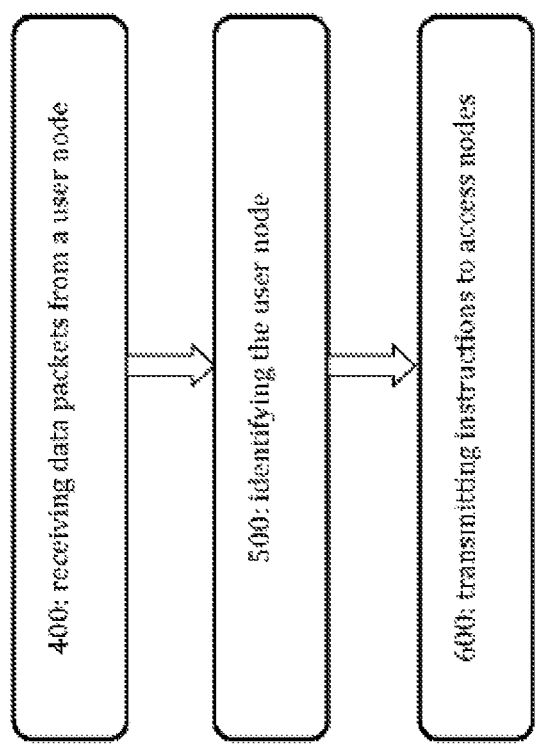

Embodiments of the present invention also relate to a corresponding method in a gateway node of a communication network. The method comprises the steps of receiving 400 data packets from a user node 3 of the system; identifying 500 the user node 3 e.g. by using an encrypted identity with a public key of the gateway node; and transmitting 600 instructions to one or more access node devices 1 of the system whether data packets from the user node 3 should be forwarded in a stateless mode over a first path to the gateway node device 4, the first path being a default path, or in a stateful mode over a second path to a destination node, the second path being determined by user and/or session specific information for the user node 3. The instruction may e.g. be signalled in a suitable communication protocol. This method in the gateway node is illustrated in FIG. 13.

Moreover, as understood by the person skilled in the art, any method according to the embodiments of the present invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present access node device and/or the gateway node device comprises the necessary communication capabilities in the form of e.g., functions, means, units, elements, etc., for executing the present method. Examples of other such means, units, elements and functions are: processors, memory, encoders, decoders, mapping units, multipliers, interleavers, deinterleavers, modulators, demodulators, inputs, outputs, antennas, amplifiers, DSPs, MSDs, TCM encoder, TCM decoder, interfaces, communication protocols, etc. which are suitably arranged together. Examples of access node device are base stations (such as eNB or NB), radio node controllers, access points (for example for IEEE 802.11) and other devices with the similar functionalities and capabilities.

Especially, the processors of the present access node or gateway node devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Figure 11:
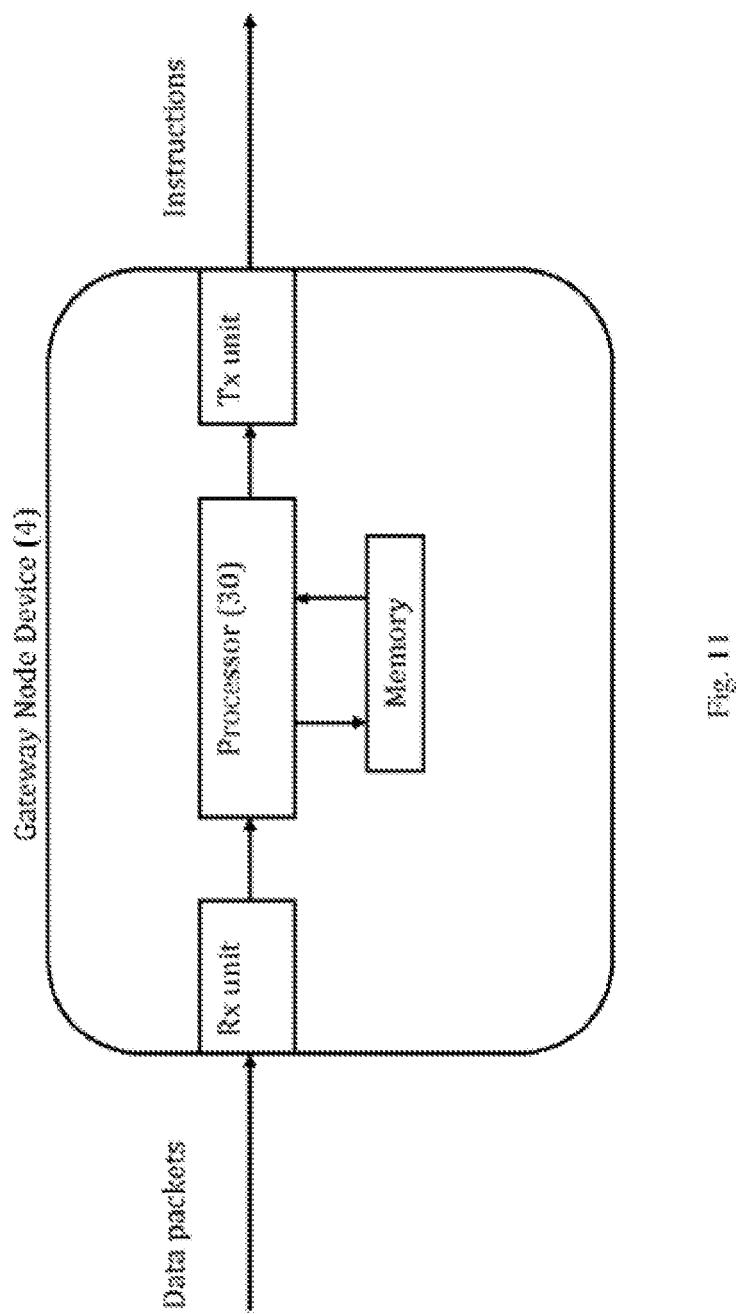
FIG. 11 illustrates a gateway node device according to an embodiment of the present invention.

FIGS. 11 and 12 illustrate two different embodiments of a gateway node device 4 according to embodiments of the present invention. The device 4 in FIG. 11 comprises a receiver unit (Rx) for receiving data packets from a user node, a processor 30 coupled to a memory for identifying the user device and to transmit instructions to one or more access nodes about the stateless or the stateful mode of forwarding data packets from the user node in the system.

The alternative gateway node device 4 is illustrated in FIG. 12 and comprises a receiver unit (Rx) for receiving data packets from a user node, an identification unit coupled for identifying the user node, a control unit for controlling one or more access nodes by signalling instructions about the stateless or the stateful mode of forwarding to the access nodes which is performed by a transmit unit (Tx).

Finally, it should be understood that the present disclosure is not limited to the embodiments described above, but also relates to and incorporates all embodiments within the scope of the appended independent claims.

What is claimed is:

1. An access node device arranged for receiving and forwarding data packets in a communication network, comprising at least one processor arranged to:
   receive data packets from a user node; and
   forward the data packets in a stateless mode over a first path to a destination gateway node, the first path being a default path, or
   forward the data packets in a stateful mode over a second path to a destination node, the second path being determined by at least one of user or session specific information for said user node; and
   receive instructions about policing, charging and security for data packets, from said destination gateway node when switching from forwarding the data packets in the stateless mode to forwarding the data packets in the stateful mode.

2. The access node device according to claim 1, wherein said destination gateway node is a service provider gateway (SPGW) node associated with a specific service provider.

3. The access node device according to claim 2, further arranged to forward data packets in the stateless mode according to an identifier identifying a service provider network associated with the SPGW.

4. The access node device according to claim 3, wherein the identifier is a global unique identity for the service provider network.

5. The access node device according to claim 4, further arranged to use a routing table to map service provider identities with SPGW addresses when forwarding the data packets in the stateless mode.

6. The access node device according to claim 1, further arranged to use a reserved link layer address to identify data packets forwarded in the stateless mode.

7. The access node device according to claim 1, further arranged to forward data packets in the stateless mode to said destination gateway node over at least one tunnel.

8. The access node device according to claim 1, wherein the user specific information relates to one or more in the group comprising: type of subscription, encryption keys, quality of service requirements, charging information, active services of a user node, active applications of a user node, and security requirements of a user node.

9. The access node device according to claim 8, further arranged to use at least one of the user or session specific information in the stateful mode for controlling one or more system parameters in the group comprising: path, priority, encryption, quality of service, error control, rate limits, traffic limits, and congestion volume limits.

10. The access node device according to claim 1, further arranged to receive instructions, whether data packets should be forwarded in the stateless mode or the stateful mode, from said destination gateway node.

11. The access node device according to claim 10, wherein the instructions are only valid for a transmission session for said user node.

12. A method in an access node arranged for receiving and forwarding data packets in a communication network, the method comprising:
receiving data packets from a user node; and
forwarding the data packets in a stateless mode over a first path to a destination gateway node, the first path being a default path, or
forwarding the data packets in a stateful mode over a second path to a destination node, the second path being determined by at least one of user or session specific information for said user node; and
receive instructions about policing, charging and security for data packets from said destination gateway node when switching from forwarding the data packets in the stateless mode to forwarding the data packets in the stateful mode.

13. The method according to claim 12, said destination gateway node is a service provider gateway (SPGW) node associated with a specific service provider.

14. The method according to claim 13, further arranged to forward data packets in the stateless mode according to an identifier identifying a service provider network associated with the SPGW.

15. The method according to claim 14, wherein the identifier is a global unique identity for the service provider network.

16. The method according to claim 12, further arranged to use a routing table to map service provider identities with SPGW addresses when forwarding the data packets in the stateless mode.

17. The method according to claim 12, further arranged to use a reserved link layer address to identify data packets forwarded in the stateless mode.

18. The method according to claim 12, further arranged to forward data packets in the stateless mode to said destination gateway node over at least one tunnel.

19. A gateway node device of a communication network, comprising at least one processor arranged to:
receive data packets from a user node;
identify said user node;
transmit instructions to one or more access node devices whether data packets from said user node should be forwarded in a stateless mode over a first path to said gateway node device, the first path being a default path, or in a stateful mode over a second path to a destination node, the second path being determined by at least one of user or session specific information for said user node; and
drop the data packets received from said user node if said user node is not authorized to transmit data packets to a service provider associated with said gateway node device.

20. The gateway node device according to claim 19, wherein the one or more access node devices are instructed to forward data packets from said user node in the stateless mode or the stateful mode depending on type of service associated with the data packets from said user node.

21. The gateway node device according to claim 20, wherein the one or more access node devices are instructed to forward the data packets in the stateful mode if at least one of the following conditions satisfies:
A) an inter-arrival time for a flow of data packets from said user node is smaller than an inter-arrival time threshold, or
B) an amount of data packets in a received flow of data packets from said user node is more than a maximum threshold of consecutive data packets in the flow.

22. The gateway node device according to claim 19, wherein an identity of said user node is encrypted by means of a public key of said gateway node device.

23. A method in a gateway node of a communication network, the method comprising:
receiving data packets from a user node;
identifying said user node;
transmitting instructions to one or more access node devices whether data packets from said user node should be forwarded in a stateless mode over a first path to said gateway node device, the first path being a default path, or in a stateful mode over a second path to a destination node, the second path being determined by at least one of user or session specific information for said user node; and
drop the data packets received from said user node if said user node is not authorized to transmit data packets to a service provider associated with said gateway node device.

24. The method according to claim 23, wherein the one or more access node devices are instructed to forward data packets from said user node in the stateless mode or the stateful mode depending on type of service associated with the data packets from said user node.

25. The method according to claim 24, wherein the one or more access node devices are instructed to forward the data packets in the stateful mode if at least one of the following conditions satisfies:
A) an inter-arrival time for a flow of data packets from said user node is smaller than an inter-arrival time threshold, or
B) an amount of data packets in a received flow of data packets from said user node is more than a maximum threshold of consecutive data packets in the flow.

* * * * *